United States Patent
Catena et al.

(10) Patent No.: US 11,472,483 B2
(45) Date of Patent: Oct. 18, 2022

(54) MOTOR VEHICLE PROVIDED WITH A RELEASE SYSTEM FOR UNCOUPLING A CROSS MEMBER IN THE ENGINE COMPARTMENT IN CASE OF A FRONT CRASH

(71) Applicants: FCA ITALY S.p.A., Turin (IT); TOFAS TURK OTOMOBIL FABRIKASI ANOMIN SIRKETI, Osmangazi/Bursa (TR)

(72) Inventors: Luigi Catena, Turin (IT); Marco Arbizzani, Turin (IT); Tayfun Öztürk, Osmangazi/Bursa (TR)

(73) Assignees: FCA ITALY S.p.A., Turin (IT); TOFAS TURK OTOMOBIL FABRIKASI ANOMIN SIRKETI, Osmangazi/Bursa (TR)

( * ) Notice: Subject to any disclaimer, the term of this patent is extended or adjusted under 35 U.S.C. 154(b) by 64 days.

(21) Appl. No.: 17/072,132

(22) Filed: Oct. 16, 2020

(65) Prior Publication Data
US 2021/0114667 A1  Apr. 22, 2021

(30) Foreign Application Priority Data
Oct. 17, 2019  (EP) .................................. 19203916.2

(51) Int. Cl.
| | | |
|---|---|---|
| *B62D 21/15* | (2006.01) | |
| *B62D 27/06* | (2006.01) | |
| *B62D 21/11* | (2006.01) | |

(52) U.S. Cl.
CPC ......... *B62D 21/152* (2013.01); *B62D 27/065* (2013.01); *B62D 21/11* (2013.01); *B62D 21/155* (2013.01)

(58) Field of Classification Search
CPC .. B62D 21/152; B62D 27/065; B62D 21/155; B62D 21/11
(Continued)

(56) References Cited

U.S. PATENT DOCUMENTS 6,109,654 A   8/2000 Yamamoto et al.
9,616,931 B2 * 4/2017 Sangha ................. B62D 21/11
(Continued)

FOREIGN PATENT DOCUMENTS

EP        1510444 A1    3/2005

OTHER PUBLICATIONS

European Search Report in corresponding European patent application EP19203916 dated Apr. 9, 2020.

*Primary Examiner* — D Glenn Dayoan
*Assistant Examiner* — Dana D Ivey
(74) *Attorney, Agent, or Firm* — Harness, Dickey & Pierce, P.L.C.

(57) ABSTRACT

A motor vehicle has a passenger compartment and two longitudinal members provided with respective rear portions arranged longitudinally in the area of the passenger compartment and with respective struts, which project forward relative to the passenger compartment; the motor vehicle further has a powertrain, which is supported by the cross member and/or by the struts, and a cross member with front connection points connected to the longitudinal members so as to be suspended, by means of respective breakable connection members, and with rear connection points connected to the aforesaid rear portions by means of connection devices having weakened areas designed so as to break when a given load threshold is exceeded, in order to completely uncouple the cross member from the longitudinal members.

11 Claims, 7 Drawing Sheets

(58) Field of Classification Search
USPC .................................................. 296/187.09
See application file for complete search history.

(56) References Cited

U.S. PATENT DOCUMENTS

| | | |
|---|---|---|
| 2011/0198889 A1 | 8/2011 | Takeshita et al. |
| 2013/0008735 A1* | 1/2013 | Hiramatsu ............. B60K 17/22 |
| | | 180/291 |
| 2014/0203543 A1* | 7/2014 | Onishi .................... B60G 7/02 |
| | | 280/784 |
| 2015/0274210 A1 | 10/2015 | Hoiss |

* cited by examiner

MOTOR VEHICLE PROVIDED WITH A RELEASE SYSTEM FOR UNCOUPLING A CROSS MEMBER IN THE ENGINE COMPARTMENT IN CASE OF A FRONT CRASH

CROSS-REFERENCE TO RELATED APPLICATION

This patent application claims priority from European Patent Application No. 19203916.2 filed on Oct. 17, 2019, the entire disclosure of which is incorporated herein by reference.

TECHNICAL FIELD

The invention relates to a body of a motor vehicle provided with a release system for uncoupling a cross member in the engine compartment in case of a front crash.

BACKGROUND OF THE INVENTION

As it is known, the body of motor vehicles is designed so as to obtain an adequate safety for the passengers in case of accidents. In particular, in order to bear the load due to front crashes, the engine compartment of motor vehicles is provided with longitudinal struts having collapsible areas to absorb energy.

Generally speaking, the front end of the motor vehicle is supported by two main struts and by two lower struts, which are arranged lower than the main struts. The rear ends of the two lower struts are connected to one another by a cross member, which supports the front suspensions and the powertrain (defined by the engine and by the transmission of the motor vehicle).

In case of a front crash at relatively high speeds, the powertrain needs to deform the structure defining the passenger compartment as little as possible, so as to avoid trauma to the legs of the driver and the front passenger of the motor vehicle. Furthermore, it is necessary to limit the deceleration of the occupants of the passenger compartment as much as possible.

In order to fulfil these needs, some known solutions provide a pyrotechnic release system, which, in case of a crash, explodes and causes the cross member to be uncoupled, so as to let the powertrain fall.

On the other hand, other prior art solutions do not involve the use of pyrotechnic devices to uncouple the cross member.

Patent EP1361099 describes a sub-frame, which is arranged under the two main struts and comprises two longitudinal elements, a front cross member and a rear cross member. The two longitudinal members have a cut which allows them to bend downwards when the front end of the motor vehicle experiences a front crash to an extent exceeding a given threshold. The powertrain is supported by two side connection members, each fixed, at the top, to a main strut and, at the bottom, to a longitudinal element of the sub-frame. In EP1361099, the two connection members have a cut that allows them to break when the load reaches a given threshold during the bending of the longitudinal elements of the sub-frame, so as to uncouple the powertrain from the main struts.

By so doing, the powertrain remains constrained to the sole sub-frame, which, by bending, moves downwards and drags the powertrain.

The drawback of this solution lies in the fact that the powertrain is forced to move backwards together with the sub-frame during the plastic deformation thereof, so that it risks, anyway, hitting and deforming the structure defining the passenger compartment.

In order to overcome this drawback, patent EP2810854 describes a solution in which the powertrain is connected to a lower cross member and to the upper struts by means of supports which automatically break when a given threshold is exceeded in case of a front crash of the motor vehicle. Therefore, in this way, the powertrain is uncoupled from the cross member.

In this type of solutions, a further drawback arises, namely the fact that, in case of a front crash, the cross member is not completely uncoupled from the other components of the body and, therefore, causes negative effects on the occupants of the passenger compartment, since it has tendency to transmit greater stresses.

In order to overcome this drawback, it is necessary to ensure the release of the cross member supporting the powertrain and the other mechanical components, so that the cross beam can slide under the vehicle floor following the accident.

SUMMARY OF THE INVENTION

The object of the invention is to provide a motor vehicle provided with a release system for uncoupling a cross member in the engine compartment in case of a front crash, which can fulfil the needs discussed above in a simple and economic fashion.

According to the invention, there is provided a motor vehicle provided with a release system for uncoupling a cross member in the engine compartment in case of a front crash as set forth in claim 1.

BRIEF DESCRIPTION OF THE DRAWINGS

The invention will be best understood upon perusal of the following detailed description of a preferred embodiment, which is provided by way of non-limiting example, with reference to the accompanying drawings, in which.

DETAILED DESCRIPTION OF THE INVENTION

Figure 1:
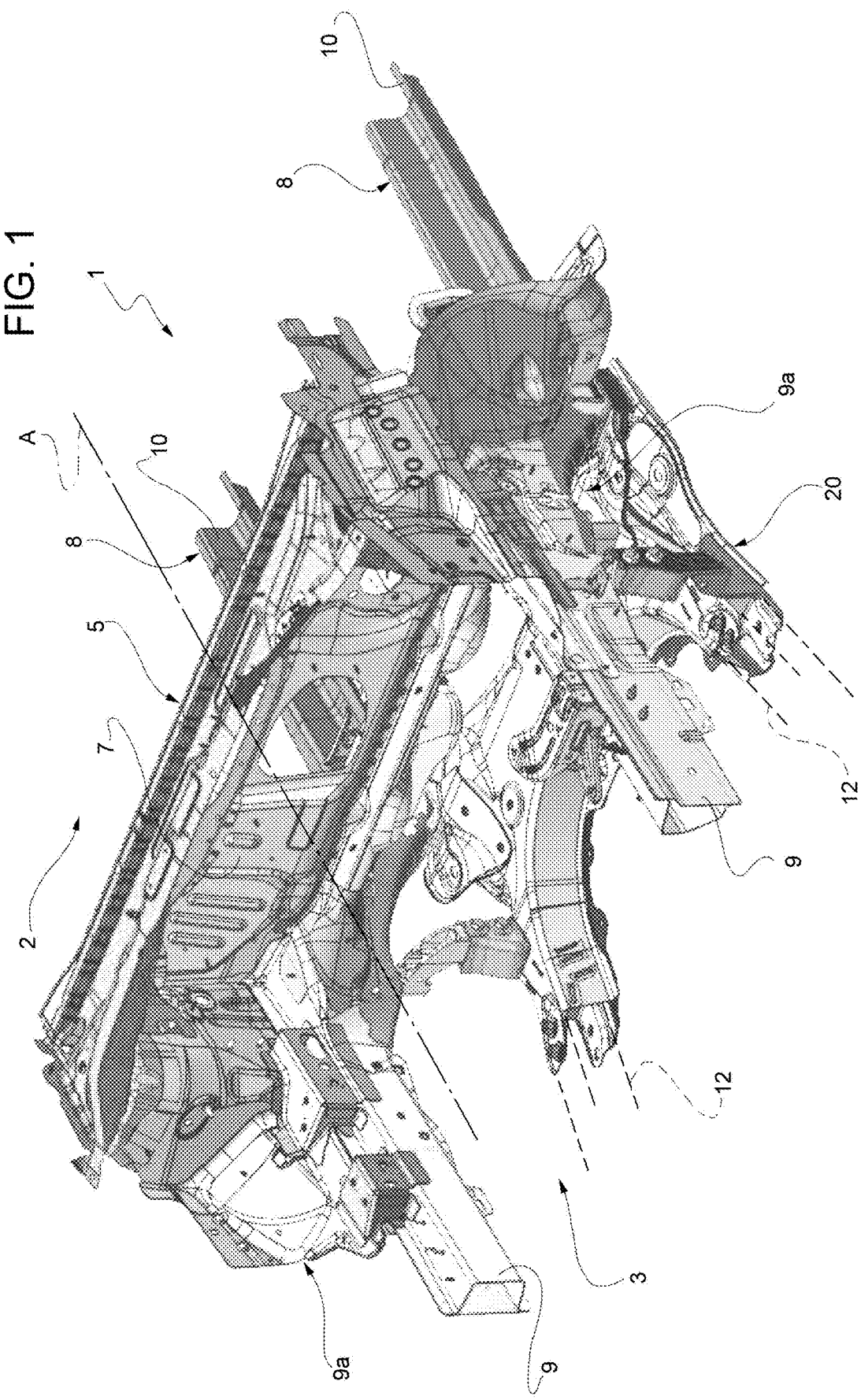
FIGS. 1 and 2 are simplified perspective views, with parts removed for greater clarity, which show a preferred embodiment of the motor vehicle provided with a release system for uncoupling a cross member in the engine compartment in case of a front crash according to the invention.
Figure 2:
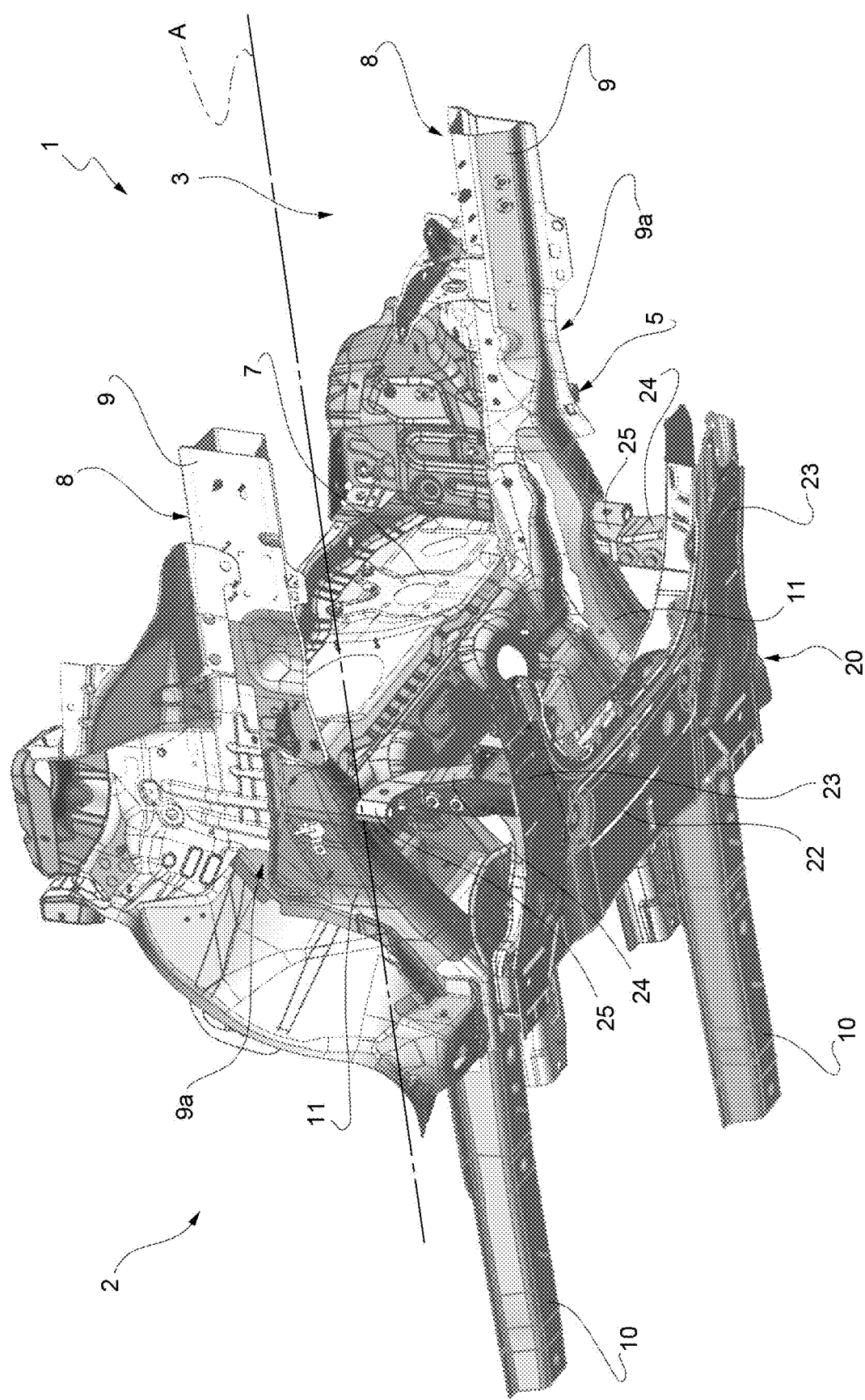
Figure 7:
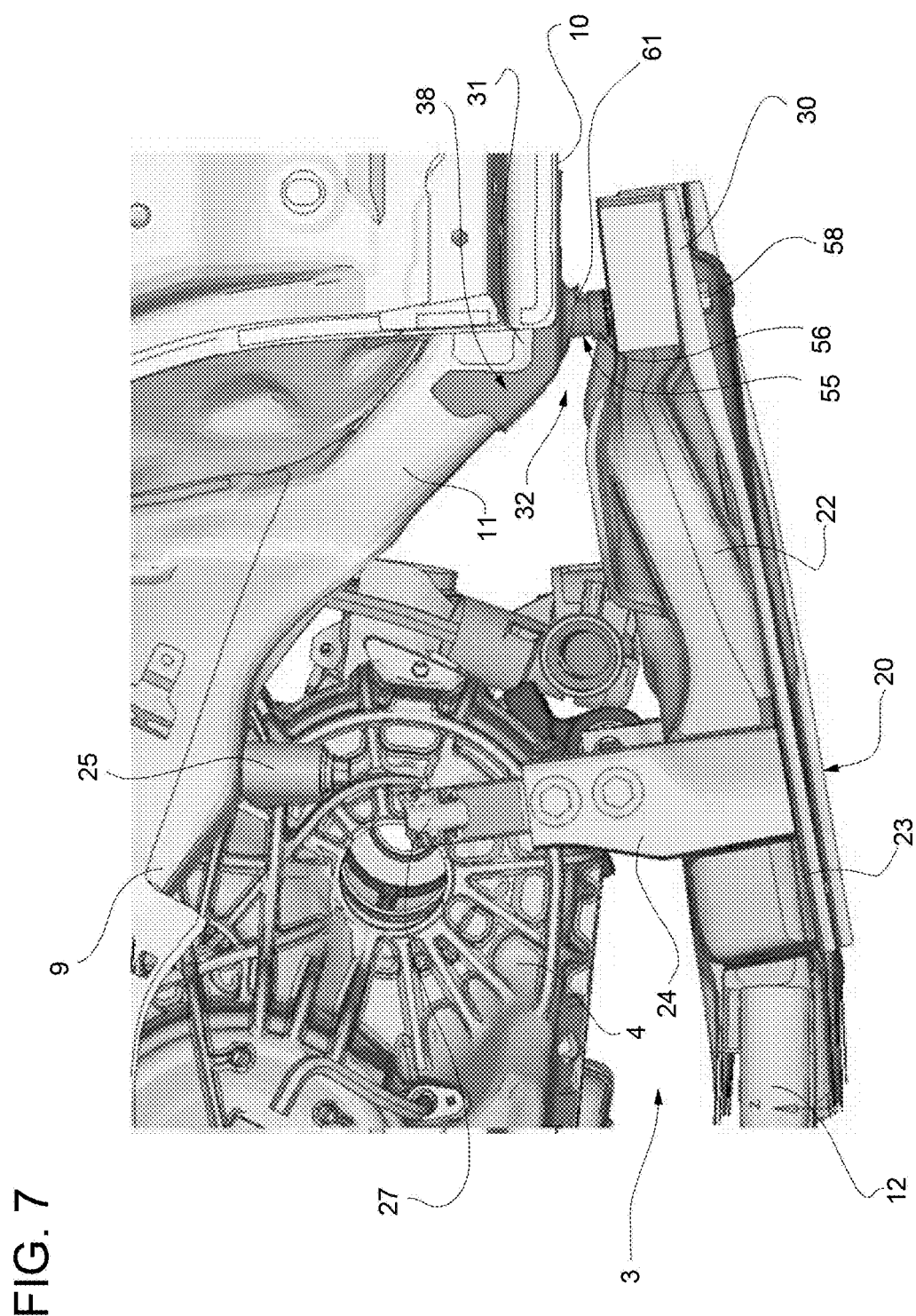
FIG. 7 is a lateral view showing, in a simplified manner, the engine compartment during a front crash.

In FIGS. 1 and 2, number 1 indicates, as a whole, a motor vehicle (which is partially shown) having a passenger compartment 2 and an engine compartment 3, which is arranged in front of a lower area of the passenger compartment 2 and houses a powertrain, which is partially shown in FIG. 7, where it is indicated with number 4. In particular, the powertrain 4 is defined by an engine and a transmission.

With reference to FIGS. 1 and 2, again, the lower area of the passenger compartment 2 is delimited, at the bottom, by a floor (not shown) and, at the front, by a substantially vertical wall 7 known as "firewall". The floor and the wall 7 are part of a body 5, which also comprises two longitudinal members 8. The longitudinal members 8 comprise respective front struts 9, which extend along directions that are substantially parallel to a moving direction A of the motor vehicle 1, project forwards relative to the wall 7, starting from a higher point relative to the floor, and—in a horizontal direction—are beside respective wheelhouse compartments 9a, which accommodate the front wheels (not shown) of the motor vehicle 1.

Figure 3:
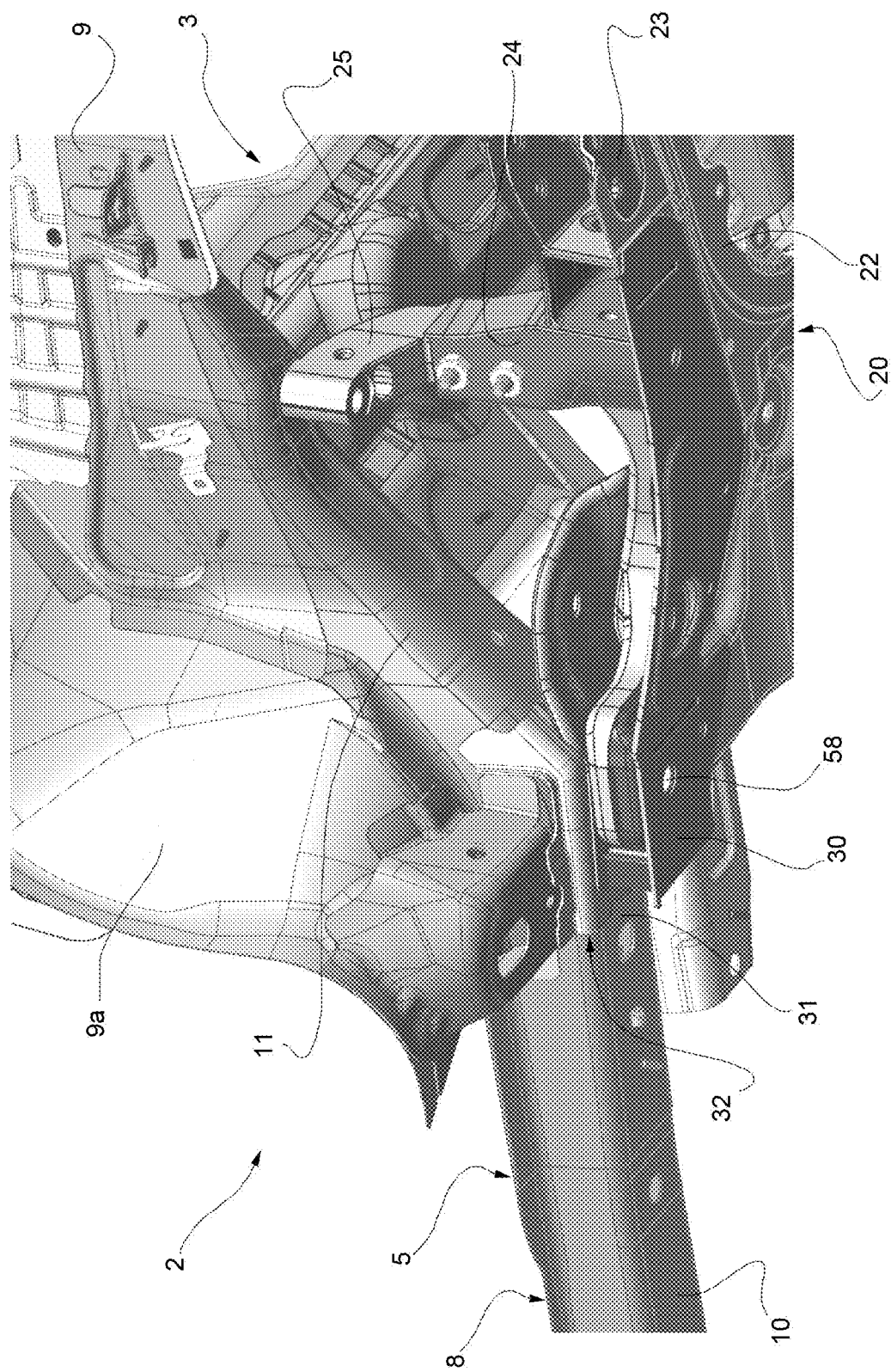
FIG. 3 is an enlargement of a detail of FIG. 2.

With reference to FIGS. 2 and 3, the longitudinal members 8 further comprise respective rear portions 10, which are arranged in the area of the floor, and respective inclined portions 11, which are arranged along the wall 7 and join the portions 10 to the struts 9.

The body 5 can also comprise a pair of secondary struts, which are not shown, are arranged above the wheelhouse compartments 9a and project forward from the front posts supporting the side doors (not shown) of the motor vehicle 1.

The motor vehicle 1 further comprises two lower struts, which are partially shown in FIG. 1 (with a broken line) and in FIG. 7 and are indicated with number 12. The struts 12 are arranged lower than the struts 9 and have respective axes which are substantially straight and, in particular, have an inclination from the top to the bottom, in a side view, and an inclination from the outside to the inside, if observed in a view from the bottom, moving forward from the passenger compartment 2 along the direction A.

The front ends of the struts 9 and 12 support a frame (not shown), which, in turn, supports a heat exchanger assembly (not shown) and a bumper (not shown).

The rear ends of the struts 12 are fixed to a cross member 20 in a known manner, which is not described in detail.

With reference to FIG. 2, the cross member 20 comprises: a cross portion 22, which extends from a longitudinal member 8 to the other one; and two arms 23, which project forward from the side ends of the portion 22 and, considering the view from the bottom, are substantially aligned with the struts 12 and join them to such side ends. Taking into account the cross member 20 in a side view, on the other hand, the portion 22 and the arms 23 are substantially horizontal.

The cross member 20 further comprises two brackets 24, which extend upwards starting from the arms 23 and/or from the side ends of the portion 22 and define respective front connection points, connected to the rear ends of the struts 9 and/or to the front ends of the portions 11, by means of respective connection members 25. Generally speaking, the connection members 25 are vertically arranged between the struts 9 and the cross member 20, so as to allow the latter to be suspended, and comprise respective weakened or breakable areas 27 (FIG. 7), which are designed so as to break and, hence, uncouple the cross member 20 from the struts 9 when a given threshold load is reached. In particular, the connection members 25 are generally called "chandeliers". For example, the weakened area 27 (FIG. 7) is obtained by means of a thickness reduction or by means of a cut.

The powertrain 4 is connected to the struts 9 and to the cross member 20 by means of a plurality of supports, which are not shown, are not described in detail and are preferably breakable, namely are designed so as to automatically break when a given stress threshold is exceeded in case of an accident with a front crash of a relatively large extent, just like the connection members 25, so as to uncouple the powertrain 4 from the longitudinal members 8 and from the cross member 20.

With reference to FIG. 3, the cross member 20 further comprises two brackets 30 defining respective rear connection points, which are arranged more at the back than the brackets 24 and are coupled to the front ends 31 of the portions 10 by means of respective connection devices 32. In particular, the brackets 30 laterally project outwards from the portion 22 as an extension of the portion 22 itself. This description will only discuss a single one of the devices 32, namely the one placed on the right side of the body 5, as it is similar to the one on the left side.

Figure 4:
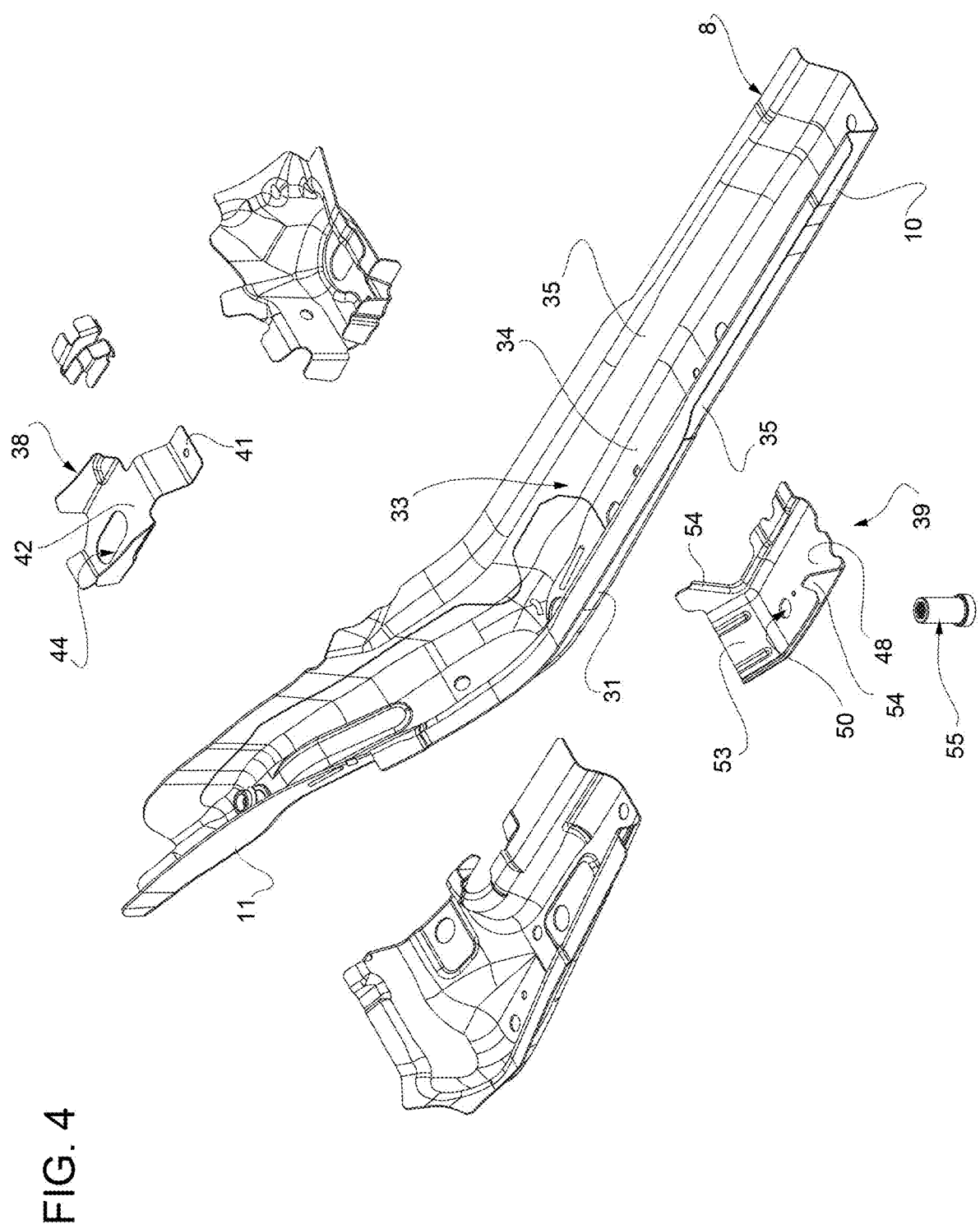
FIG. 4 is a perspective exploded view of some components shown in FIGS. 2 and 3.
Figure 5:
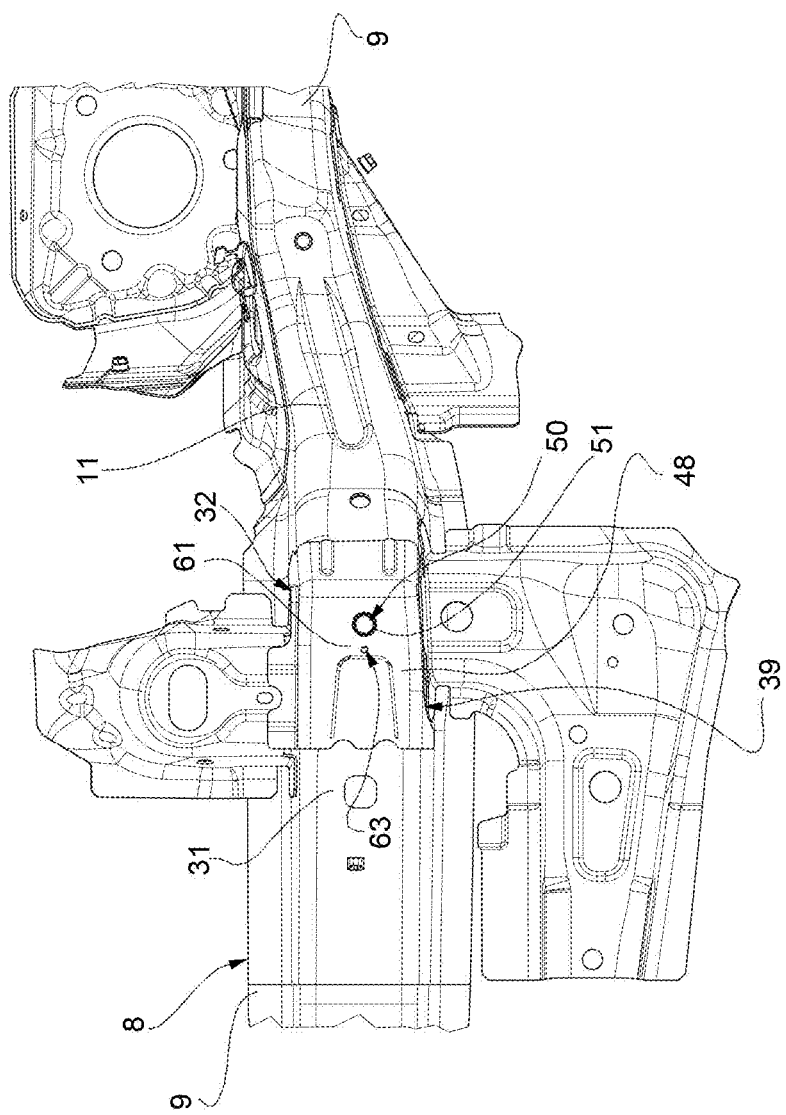
FIG. 5 is a view from the bottom of the detail of FIG. 3, with parts removed for greater clarity.
Figure 6:
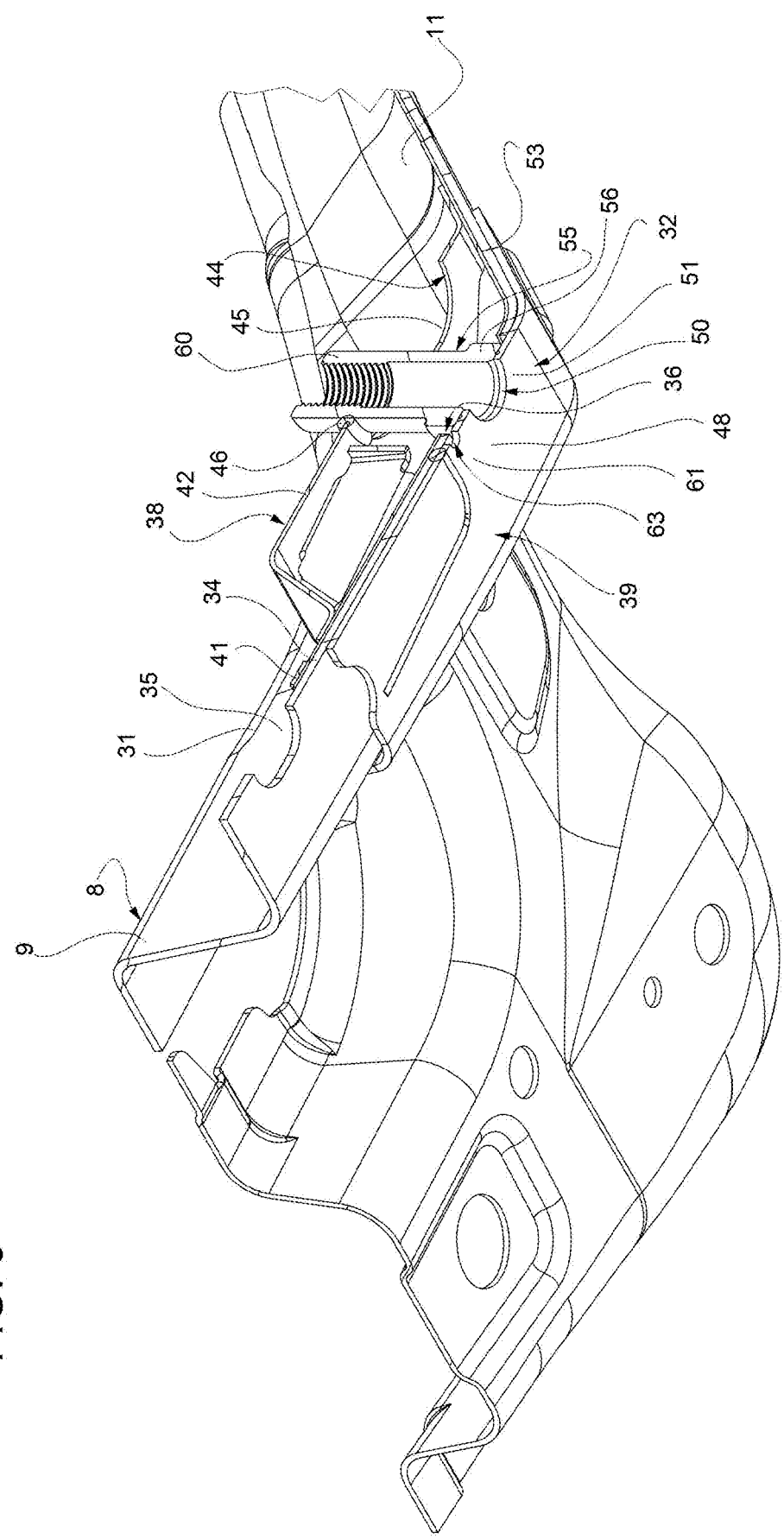
FIG. 6 shows, in perspective from the bottom and in a sectional view according to the section plane VI-VI of FIG. 5, the detail of FIG. 5.

According to FIGS. 4 to 6, the end 31 is U-shaped or omega-shaped, in a cross section view, so as to define a recess 33, which faces upwards and longitudinally extends along the longitudinal member 8. In other words, the end 31 comprises an approximately horizontal base wall 34 and two side walls 35, which project upwards from side edges of the base wall 34, are joined to the base wall 34 and face one another, so as to define the recess 33.

According to FIG. 6, in particular, the walls of the longitudinal member 8 at the end 31 and at the portion 11 are at least partly multi-layered, namely they consist of a main layer or wall and of at least one reinforcement layer or wall, which at least partly overlaps the main one.

The base wall 34 has a through hole 36 with a substantially vertical axis. At the same time, the device 32 comprises two shaped reinforcement plates 38 and 39, which are arranged on opposite sides of the base wall 34.

The plate 38 is arranged in the recess 33, namely above the base wall 34, and is fixed to the end 31 and/or to the portion 11, preferably through welding. For example, the plate 38 has wings which overlap and are welded to both the base wall 34 and the walls 35. For example, the plate 38 comprises at least one wing 41, which rests against and is welded to the end 31, and a wall 42, which is joined to the wing 41, is vertically spaced apart from the base wall 34 and faces the latter.

According to a preferred aspect of the invention, the wall 42 has an opening 44, which is axially aligned with the hole 36. Preferably, the opening 44 has a greater width than the hole 36 and, for example, has a longitudinally oblong peripheral edge 45 so as to form a slot. More preferably, the edge 45 has a curved portion 46, which is vertically aligned with the hole 36.

The plate 39, on the other hand, is arranged under the base wall 34, rests against the latter and is fixed to the end 31 and/or to the portion 11, preferably through welding. The plate 39 comprises a wall 48 resting against a lower face of the base wall 34 and having a through hole 50, which is coaxial to the hole 36 and has smaller dimensions than the hole 36, so that the hole 50 is defined by an annular portion 51 of the wall 48 surrounded by the edge of the hole 36.

Preferably, the plate 39 further comprises a wall 53, which is joined to the wall 48 and rests against the portion 11. According to FIG. 4, the plate 39 also comprises two side wings 54, which project upwards from the walls 48 and/or 53 and are joined to the latter so as to define a U-shaped cross section which is similar to the one of the longitudinal member 8. In particular, the wings 54 respectively rest against the outer faces of the walls 35.

The device 32 further comprises a nut screw 55, which is coaxial to the holes 36 and 50 and is fixed relative to the end 31, but is supported by the plate 38 and/or by the plate 39 and not directly by the end 31. In particular, according to FIG. 6, the nut screw 55 comprises a lower end 56, which axially rests against the annular portion 51 and is preferably welded to the latter. Therefore, the lower end 56 is surrounded by the edge of the hole 36, with clearance, and the annular portion 51 is axially clamped between the nut screw 55 and the bracket 30 of the cross member 20 due to the tightening of a crew 58 (FIG. 3), which goes through the bracket 30, engages the hole 50 and is screwed into the nut screw 55.

With reference to FIG. 6, again, the nut screw 55 is preferably welded to the plate 38, for example to the curved portion 46 of the edge 45. More preferably, the nut screw 55 comprises an upper end 60, which projects upwards relative to the wall 42 of the plate 38 and is provided with an inner thread, into which the screw 58 is screwed.

According to a preferred aspect of the invention, the wall 48 comprises a weakened area 61, which is arranged in a position relatively close to the edge of the hole 50, namely is arranged in a position immediately adjacent to the annular portion 51, against which the lower end 56 of the nut screw 55 axially rests. The weakened area 61 is designed so as to break when a given stress threshold is exceeded. Through this breaking, basically, the annular portion 51 breaks and is uncoupled from the remaining part of the plate 39. According to FIG. 7, this breaking, together with the breaking of the weld connecting the nut screw 55 to the plate 38, allows the nut screw 55 to be uncoupled from the longitudinal member 8 together with the screw 58. Therefore, in this way, the cross member 20 is released from the longitudinal member 8 in case of an accident.

With reference to FIG. 5, preferably, the weakened area 61 is arranged in a local manner behind the hole 50 (considering the longitudinal driving direction of the motor vehicle 1). For example, the weakened area can become a virtual hinge, around which the annular portion 51 tends to bend downwards when the struts 12 and the cross member 20 are stressed during a front crash.

For example, according to FIG. 6, the weakened area 61 is vertically aligned with at least part of the edge of the hole 36.

In particular, the weakened area 61 comprises at least one hole 63, which has smaller dimensions that the hole 50. More in particular, the hole 63 goes through the wall 48 of the plate 39. According to variants which are not shown herein, in combination with or as an alternative to the hole 63, the weakened area 61 comprises at least one cut on the wall 48 and/or a reduction in the thickness of the wall 48. As already mentioned above, the hole 63 is longitudinally arranged behind the hole 50.

In case of a front crash of a relatively large extent, the longitudinal load due to the crash causes a bending of the struts 12. This bending tends to increase the load component transmitted downwards to the arms 23 and, as a consequence, to the connection members 25. This overload causes the breaking of the connection members 25 at the weakened areas 27 and, hence the release of the brackets 24 from the struts 9, as it is shown in FIG. 7.

After this breaking, the load transmitted by the struts 12 keeps pushing the cross member 20 downwards, thus causing it to rotate, substantially pivoting around the ends 31 and/or the weakened areas 61 (in a counter-clockwise direction in FIG. 7). Due to this rotation, the cross member 20 tends to move away from the struts 9, thus freeing space for the backward and downward movement of the powertrain 4 and tends to stress the devices 32 to a greater extent until the plates 39 break in the weakened areas 61 and the weld connecting the nut screws 55 to the plates 38 breaks as well. In this way, the cross member 20 is completely uncoupled from the longitudinal members 8 and, as a consequence, can slide under the floor of the motor vehicle 1.

At the same time, the powertrain 4 is not dragged together with the cross member 20, but is released from the cross member 20 and from the longitudinal members 8 in a known manner, which is not described in detail. Following this uncoupling operation, the powertrain 4 moves depending on the intensity of the crash and depending on the spaces created in the engine compartment 3 during the plastic deformation of the body 5, regardless of the movement of the cross member 20.

In particular, the powertrain 4 has enough space to avoid hitting the wall 7, namely to avoid particular deformations in the passenger compartment 2 and particular deceleration peaks for the occupants of the passenger compartment 2.

In particular, by means of simulations it is possible to see that the powertrain 4 moves backwards relative to its original position and simply rests against the wall 7. At the same time, the cross member 20 independently uncouples itself from the longitudinal members 8 and moves freely, namely in an autonomous manner.

Therefore, it is evident that the solution suggested for releasing the cross member 20 is effective, since the cross member 20 is completely uncoupled from the longitudinal members 8.

Moreover, the release is relatively simple as it does not require pyrotechnic elements, but only involves proper measures to be adopted at the devices 32 as well as at the connection members 25. Indeed, the features described above lead to simplicity advantages compared to similar bodies of the prior art.

Finally, owing to the above, it is evident that the motor vehicle 1 described with reference to the accompanying drawings can be subjected to changes and variations, which do not go beyond the scope of protection of the invention, as set forth in the appended claims.

In particular, the cross section of the struts 12 and/or of the longitudinal members 8 and/or the shape of the cross member 20 and/or the configuration of the connection members 25 could be different from the ones indicated herein by mere way of example.

The invention claimed is:

1. A motor vehicle comprising:
a passenger compartment;
two longitudinal members comprising respective rear portions arranged longitudinally in the area of said passenger compartment and respective struts, which project forward relative to said passenger compartment;
a cross member having front connection points and rear connection points;
a powertrain, which is supported by said cross member and/or by said struts;
connection members, which connect said front connection points to said longitudinal members, so as to keep said cross member suspended relative to said struts, and comprise respective breakable areas, which are designed so as to break when a given load threshold is exceeded;
connection devices, which connect said rear connection points to said rear portions;
wherein said connection devices comprise respective weakened areas designed to break so as to completely uncouple said cross member from said longitudinal members when a given load threshold is exceeded;

wherein said rear portions comprise respective connection walls having respective first holes, said connection devices comprising:
respective plates, which are fixed relative to said connection walls and have respective second holes vertically aligned with said first holes;
respective first connection elements, which are coupled to said plates through welds at said second holes;
respective second connection elements, which fix said rear connection points to said first connection elements; and
said weakened areas being part of said plates and/or of said welds.

2. The motor vehicle according to claim 1, characterized in that said first connection elements are defined by respective nut screws and said second connection elements are defined by respective screws.

3. The motor vehicle according to claim 1, characterized in that said first connection elements engage said first holes with clearance.

4. The motor vehicle according to claim 3, characterized in that said plates comprise first plates arranged under said connection walls and comprising respective annular portions delimiting said second holes; said first connection elements comprising respective lower portions vertically resting against and/or fixed to said annular portions.

5. The motor vehicle according to claim 3, characterized in that said plates comprise second plates arranged above said connection walls; said first connection elements being welded to respective edge portions delimiting said second holes.

6. The motor vehicle according to claim 5, characterized in that said first connection elements comprise respective upper portions projecting upwards relative to said second plates; said first connection elements being coupled to said upper portions.

7. The motor vehicle according to claim 1, characterized in that said weakened areas are part of said plates.

8. The motor vehicle according to claim 7, characterized in that said weakened areas are arranged behind said second holes.

9. The motor vehicle according to claim 7, characterized in that said weakened areas are longitudinally aligned with said second through holes.

10. The motor vehicle according to claim 7, characterized in that said weakened areas comprise respective third holes with smaller dimensions than said second holes.

11. The motor vehicle according to claim 7, characterized in that said weakened areas are vertically aligned with edge portions of said first holes.

* * * * *